US010589683B2

(12) United States Patent
Bortolon et al.

(10) Patent No.: US 10,589,683 B2
(45) Date of Patent: Mar. 17, 2020

(54) TRAPPED CUTLINE GASKET FOR EXTERNAL SIDE MIRROR

(71) Applicant: Ficosa North America Corporation, Madison Heights, MI (US)

(72) Inventors: Christopher Bortolon, Commerce Township, MI (US); Nicholas Irwin, Clawson, MI (US)

(73) Assignee: FICOSA NORTH AMERICA CORPORATION, Madison Heights, MI (US)

( * ) Notice: Subject to any disclaimer, the term of this patent is extended or adjusted under 35 U.S.C. 154(b) by 182 days.

(21) Appl. No.: 15/850,749

(22) Filed: Dec. 21, 2017

(65) Prior Publication Data

US 2019/0193635 A1 Jun. 27, 2019

(51) Int. Cl.
*B60R 1/074* (2006.01)
*F16J 15/08* (2006.01)
*B60R 1/072* (2006.01)

(52) U.S. Cl.
CPC .............. *B60R 1/074* (2013.01); *B60R 1/072* (2013.01); *F16J 15/0818* (2013.01)

(58) Field of Classification Search
None
See application file for complete search history.

(56) References Cited

U.S. PATENT DOCUMENTS

| 2012/0188662 A1* | 7/2012 | Hamada | B60R 1/06 |
| | | | 359/871 |
| 2012/0235009 A1* | 9/2012 | Horie | B60R 1/06 |
| | | | 248/475.1 |

FOREIGN PATENT DOCUMENTS

CN 205417375 U 8/2016

* cited by examiner

*Primary Examiner* — Jennifer D. Carruth
(74) *Attorney, Agent, or Firm* — Brooks Kushman P.C.

(57) ABSTRACT

An external side mirror is pivotable relative to a vehicle to which it is attached. The external side mirror includes an outer cover, and a housing bracket within the outer cover. The housing bracket is mounted or attached to the outer cover. A gasket is removably attached to the underside of the housing bracket. The gasket has a plurality of hooks that extend upwardly and attach to the housing bracket. Support ribs extending from the outer cover trap the hooks against the housing bracket. This allows the gasket to pivot along with the external side mirror relative to the vehicle to keep the gasket hidden from view even when the external side mirror is pivoted.

15 Claims, 6 Drawing Sheets

TRAPPED CUTLINE GASKET FOR EXTERNAL SIDE MIRROR

TECHNICAL FIELD

This disclosure generally relates to a gasket for an external side mirror of a vehicle. In particular, the gasket is mounted within the mirror such that the gasket rotates with the mirror as the mirror rotates relative to the vehicle.

BACKGROUND

Passenger vehicles such as cars typically include sideview mirrors, also known as outside rearview mirrors or external side mirrors. External side mirrors are typically mounted outside the vehicle cabin to allow the driver to see the environment to the side and behind the vehicle. These mirrors can be foldable or pivotable relative to the remainder of the vehicle. The mirrors can be folded inward when, for example, the vehicle is parked so as to protect the mirrors from accidental collision or impact from other vehicles passing by.

SUMMARY

In one embodiment, an external side mirror is configured to rotate relative to a connected vehicle. The external side mirror includes an outer cover, and a housing bracket within the outer cover. The housing bracket has a lower flange defining an upper surface and a lower surface. A gasket has a base mounted to the lower surface of the lower flange. The gasket includes a plurality of hooks extending upward therefrom and attached to the upper surface of the lower flange.

The lower flange may have a perimeter with the hooks being spaced about the perimeter. The lower flange may define an opening sized to receive power electronic wiring, and the gasket may define an opening aligned with the opening in the lower flange. The gasket may be made of rubber and the hooks may be integrally-formed with the gasket. The gasket may include an upper surface, a lower surface, and a perimeter edge, wherein the hooks extend from the perimeter edge. The gasket may have a flange extending along a periphery of the lower surface. The outer cover may include a lower cover and a skull cap with a cutline gap between the skull cap and a base assembly of the vehicle. The gasket may seal the cutline gap.

In another embodiment, a gasket for an external side mirror includes a base having a top surface, a bottom surface, and an edge surface about a perimeter of the gasket. A lip is integral with the base and extends downward from the bottom surface about the perimeter. At least a portion of the lip is located such that it is configured to seal against a base assembly of a vehicle. A plurality of hooks are integral with the base about the perimeter and are configured to engage a flange of a housing bracket of the external side mirror. The hooks have a first portion extending transverse from the edge surface, a second portion extending upward and transverse from the first portion, and a top portion extending inward from the second portion. The top portion has a lower surface configured to contact the flange of the housing bracket of the external side mirror.

In yet another embodiment, an external side mirror assembly for a vehicle includes a lower cover, and a skull cap connected to the lower cover. The skull cap has a lower edge configured to at least partially define a cutline gap between the skull cap and a base assembly of the vehicle. A housing bracket is within an interior of the connected lower cover and skull cap. The housing bracket has a lower surface and an upper surface. A gasket is removably mounted to the housing bracket. The gasket includes an upper surface contacting the lower surface of the housing bracket. The gasket is aligned with the cutline gap to seal the cutline gap with respect to the interior of the connected lower cover and skull cap.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein (e.g., "upper," "lower," "inner," "outer," "top," "bottom," etc.) are intended to refer to the orientation of how the various components are illustrated in the Figures, and how the mirror disclosed herein is oriented relative to an upright vehicle. These terms are intended for contextual purposes.

Figure 1:
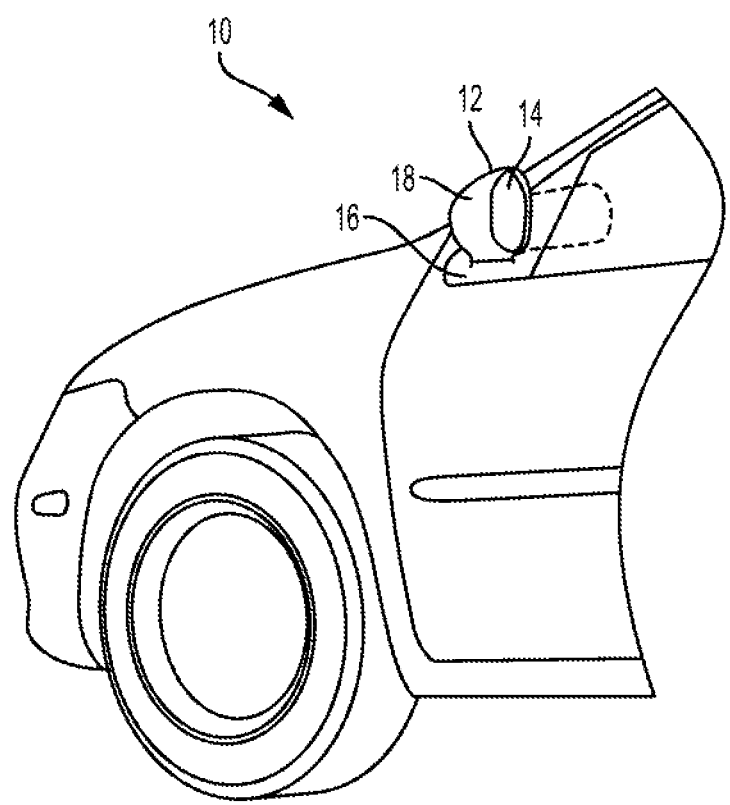
FIG. 1 is a partial perspective view of a side of a vehicle having a pivotable mirror, according to one embodiment.
Figure 2:
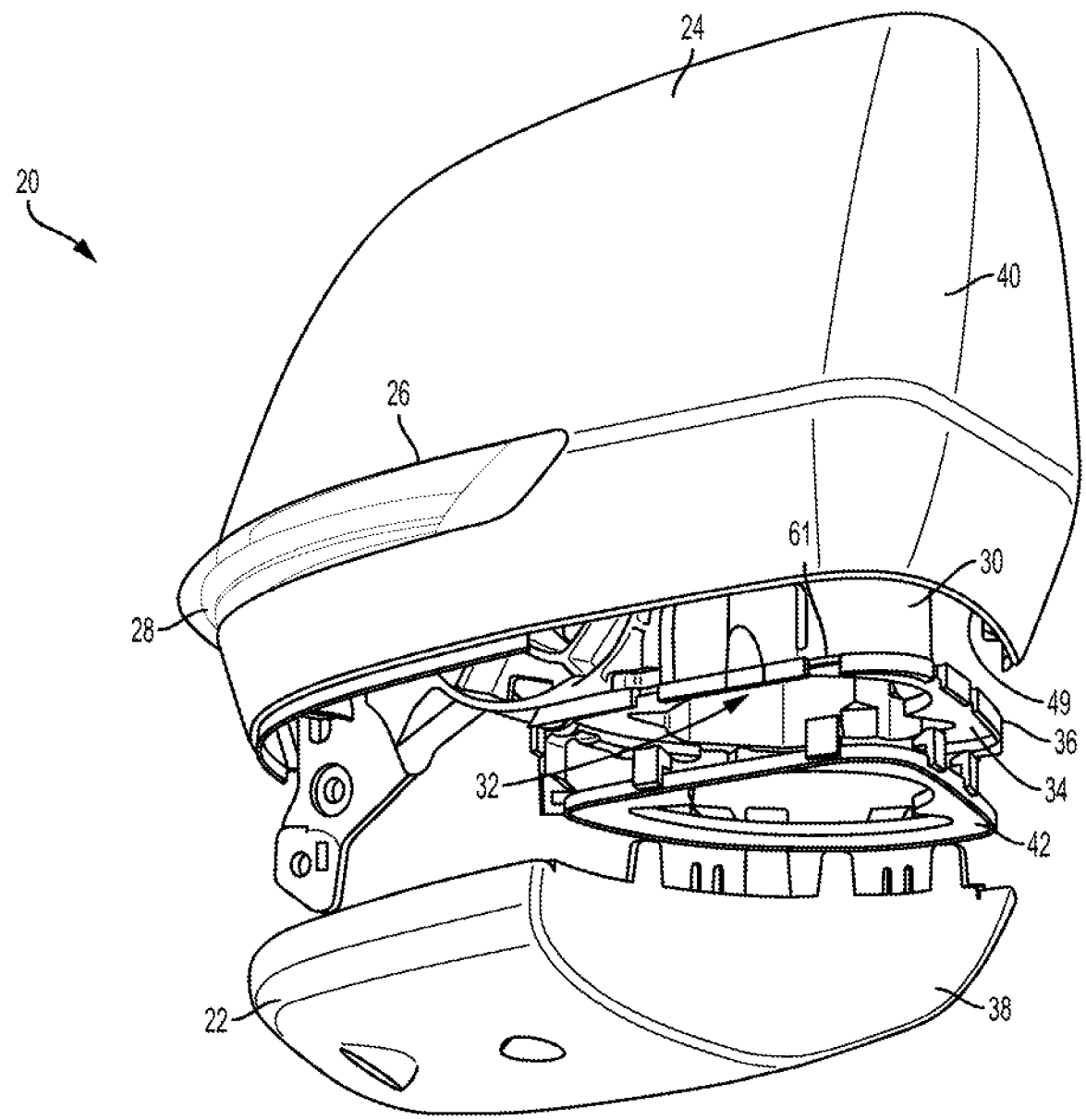
FIG. 2 is a perspective exploded view of a pivotable external side mirror, according to one embodiment.

FIG. 1 shows a partial view of a front driver-side of a vehicle 10 having a sideview mirror 12, also known as an external side mirror. The vehicle 10 is a passenger vehicle such as a car, van, truck, SUV, or the like. The external side mirror 12 is on the outside of the vehicle 10, and can also be referred to as an outside or external rearview mirror, a wing mirror, and other terms known in the art to refer to such a mirror. The external side mirror 12 has a reflective mirror 14 that can have an adjustable orientation, but typically faces the side of the vehicle to give a driver a view of the surroundings on that rearward side of the vehicle.

Some external side mirrors in the art are adjustable relative to the vehicle. For example, some external side mirrors can pivot or swivel to face inward (e.g., when the vehicle is parked) or outward. For example, in FIG. 1, the external side mirror 12 is shown in use position or drive position, and the broken lines represent a parked position or folded position. The pivoting of the mirrors can be accomplished manually or automatic via a motor and associated structure. For example, in some vehicles, the pivoting of the mirror can be done automatically in response to the vehicle being turned off, in park, etc. This can reduce the chance of potential damage done to the mirror from things such as passing vehicles or environmental elements.

To enable the pivoting or swiveling, some mirrors (including embodiments of the external side mirror described herein) have a mount or base assembly 16 that is fixed to the vehicle body and an overlying cover 18 that is pivotally connected to the base assembly 16. The cover 18 at least partially surrounds the reflective mirror 14 and the accompanying motor, gears, electronics, etc. that are within the external side mirror. A small gap may exist between the base assembly 16 and the cover 18 to allow for the pivoting of the cover 18. This gap may be referred to as a cutline. If left unaccounted for, wind passing over or through this cutline can cause a whistle, especially at certain high vehicle speeds. Attempts have been made to place a gasket at this cutline. However, the current gaskets have issues with assembly, and mount in an insufficient manner to properly prevent the wind noise. Furthermore, when the skull cap pivots, the gaskets are visible which is visually undesirable.

Therefore, according to various embodiments of this disclosure, a new cutline gasket for an external side mirror is provided. As will be explained below, the gasket fits in the cutline between the base cover and the skull cap to reduce or eliminate any noise from wind passing over the cutline. The gasket mounts in an improved manner to provide various benefits, including an improved reduction in the noise from wind over the cutline, as well as reducing or eliminating the visibility of the gasket when the mirror is pivoted to face the vehicle.

Figure 4:
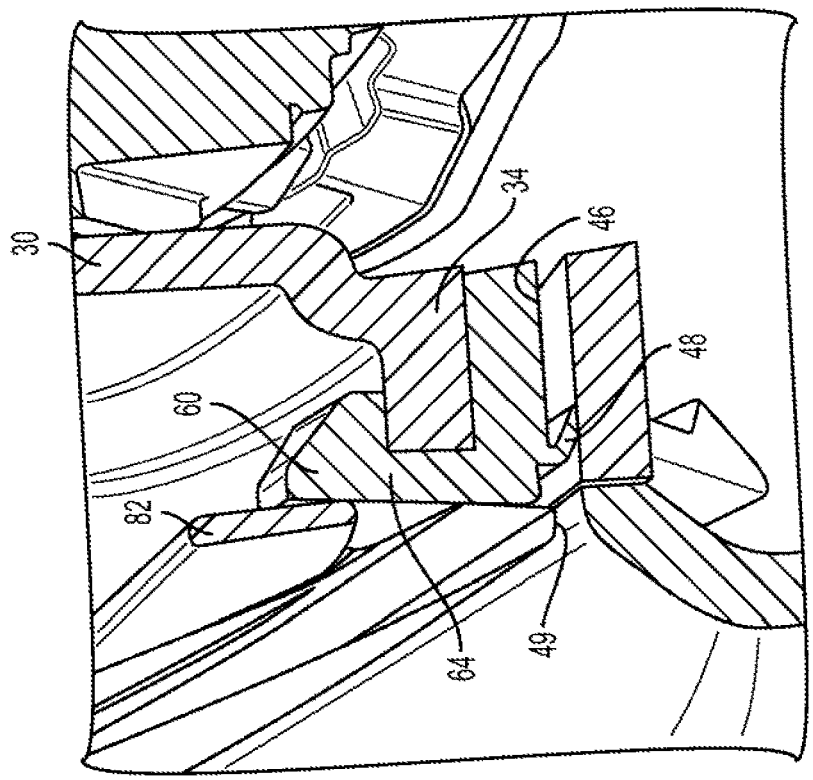
FIG. 4 is a cross-sectional view taken along line 4-4 in FIG. 3.
Figure 3:
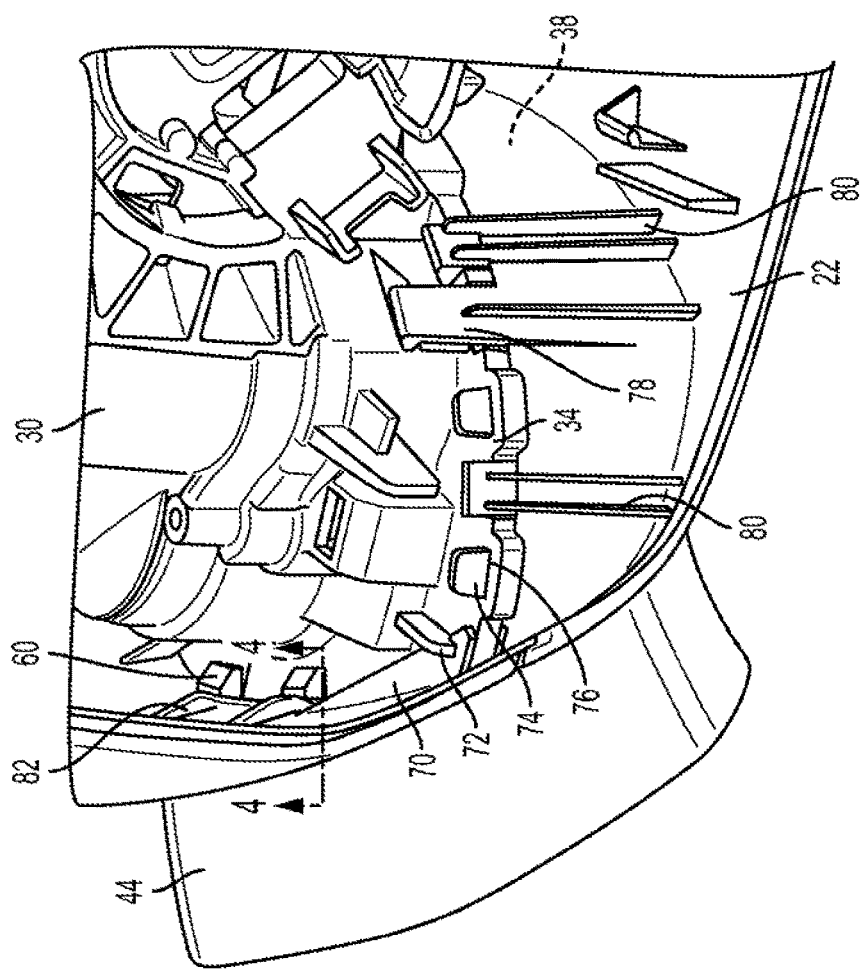
FIG. 3 is a perspective view of a portion of the mirror of FIG. 2 in an assembled state, according to one embodiment.
Figure 5:
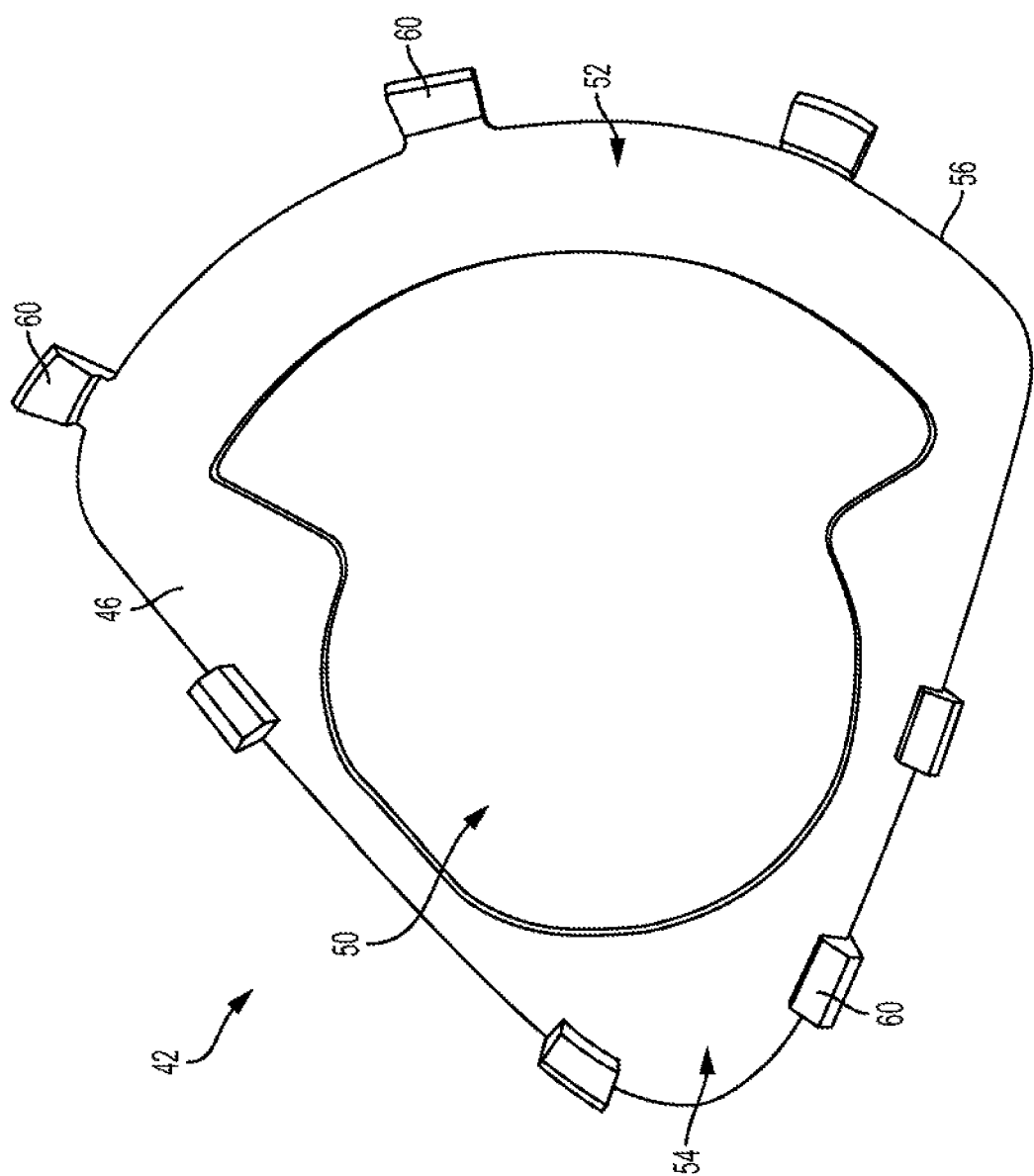
FIG. 5 is a top view of a cutline gasket housed within the mirror, according to one embodiment.

Referring to an embodiment shown in FIGS. 2-6, an external side mirror 20 is shown disassembled in an exploded view (in FIG. 2) and assembled (in FIGS. 3-4). A gasket (described below) within the external side mirror 20 is shown in isolation in FIGS. 5-6. The external side mirror 20 includes at least some of the structure and function of the external side mirror 12 described above, with additional detail and structure described below. The external side mirror 20 includes a lower cover 22 (also referred to as a base cover). The external side mirror also includes a skull cap 24 (also referred to as an upper cover, a main cover, a top cover, or an overlying shell) connected to the lower cover 22. The cover 22, and skull cap 24 can collectively be referred to as a cover or outer cover. The skull cap 24 at least partially surrounds a reflective mirror, not shown in FIG. 2 due to the orientation of the mirror. The skull cap 24 may include a recess or opening 26 with an associated light source 28 to provide as a turn signal. The lower cover 22 may include an illuminated logo, camera, puddle lamp, or other type of light known to those in the art as being part of an external side mirror.

A housing bracket 30 is mounted within the skull cap 24 and connects to an interior portion of the skull cap 24 as will be described with reference to FIG. 3. The housing bracket 30 can be made of plastic (e.g., injection-molded), carbon fiber, aluminum, steel, or other like materials. The housing bracket 30 includes a central opening 32 to protect and guide electronic wires and mechanical connections for connection to a motor, lights, and/or other components within the external side mirror 20. The housing bracket 30 has a lower flange 34 that defines a lower part of the opening 32. A portion of the flange is connected to the lower cover 22, and another portion of the flange is connected to the skull cap 24, as will be further described below. This indirectly connects the skull cap 24 to the lower cover 22.

The flange 34 has a periphery or perimeter 36 that is located within the confines of the skull cap 24. However, a large portion of the flange 34 and its perimeter 36 are located outside the confines of the lower cover 22. For example, in FIG. 2 it can be seen that the lower cover has a curved surface 38 that curves inwardly toward the interior of the mirror, and the flange 34 rests vertically above the space outside of this curved surface 38 of the lower cover 22. The skull cap 24 has a curved surface 40 that curves outwardly and extends beyond the curved surface 38 of the lower cover 22 to cover the perimeter 36 of the housing bracket 30. This allows for the wires and mechanical connections (described above) to pass through the opening 32 of the housing bracket 30 and into the interior of the skull cap 24 without passing through the lower cover 22.

A mount or base assembly 44 may also be provided that is fixed to a portion of the vehicle, such as the vehicle door. The base assembly 44 may extend laterally from the mirror to the vehicle, and also vertically into the opening 32 of the housing bracket 30, between the curved surface 38 of the lower cover 22 and the curved surface 40 of the skull cap 24. The external side mirror 20 is pivotally connected to the base assembly 44 to allow the external side mirror 20 to pivot or rotate relative to the vehicle, as described above. Also as described above, the interface between the base assembly and the external side mirror 20 may define a gap or cutline to provide clearance for the pivoting.

To account for, among other things, the undesirable wind noises at the cutline that might otherwise occur (as described above), a cutline gasket 42 is provided. The gasket 42 fills the cutline void or gap, and is trapped between the skull cap 24 and lower cover 22. The gasket 42 also seals this gap from external environmental conditions, such as rain, dirt, debris, etc. And, since the gasket 42 is attached to the housing bracket 30 from beneath, the gasket 42 swivels with the housing bracket when the external side mirror 20 is swiveled; this prevents the gasket from being visible when the external side mirror 20 is swiveled, improving the aesthetic appearance of the mirror when the vehicle is parked, for example.

In one embodiment, the gasket 42 is made from a synthetic rubber material, with sufficient flexibility yet providing the proper seal at the cutline.

The gasket 42 has a generally planar base 46, and a flange or lip 48 about its perimeter. The lip 48 extends slightly below a lower edge 49 of the skull cap 24, and acts as the surface that contacts the lower cover 22 and the base assembly 44 to create the seal. The base 46 also defines a central void or opening 50 sized similar to the opening 32 of the housing bracket 30. The opening 50 allows the electronic wires, etc. to pass therethrough, as described above. In one embodiment, the gasket 42 has a first curved region 52 that matches the profile of the curved surface 38 of the lower cover 22, and an opposing second curved region 54 that matches the profile of the curved surface 40 of the skull cap 24. The first curved region 52 has a larger radius of curvature than that of the second curved region 54, and is interior of the second curved region 54. A perimeter 56 of the gasket 42 may fit and abut the interior of the flange 34 of the housing bracket 30 such that the perimeter 36 of the flange 34 of the housing bracket 30 contains the gasket 42. The specific shape and dimension of the gasket 42 and its opening 32 is illustrated according to one embodiment, but can be altered to fit various external side mirrors.

Figure 6:
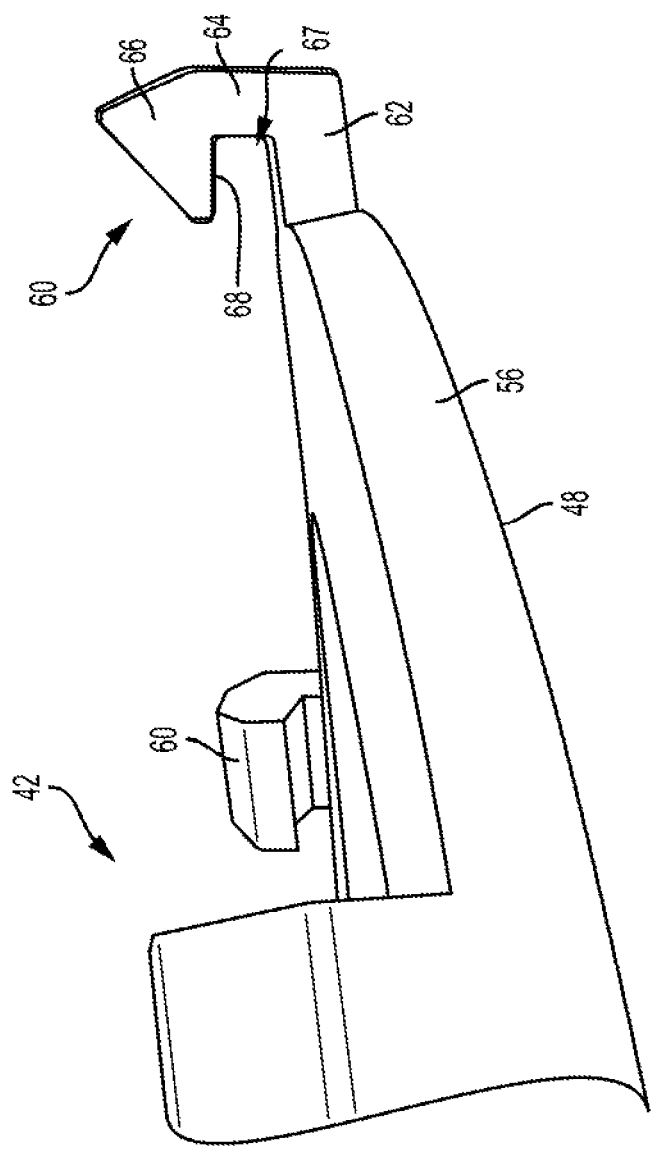
FIG. 6 is a partial side view of the gasket of FIG. 5.

The gasket 42 has a plurality of hooks or fingers 60 extending from the perimeter 56. The gasket 42 directly contacts the flange of the housing bracket from beneath, and the hooks 60 wrap around the perimeter edge 56 and contact the upper surface of the flange 34. In another embodiment, the hooks 60 extend through openings or apertures in the flange instead of wrapping around the peripheral edge of the flange. The hooks 60 extend upwardly when assembled such that the hooks are configured to engage with the housing bracket 30 (e.g., the upper surface of the flange) to mount the gasket 42 to the housing bracket 30 from beneath, as seen in FIGS. 3-4. The hooks 60 may be an integrally-formed extension of the gasket and made of the same material (e.g., rubber) as the gasket. Referring to FIGS. 3, 4, and 6, the hooks 60 include a first linear portion 62 extending transversely from the outer edge surface of the gasket 42. A second linear portion 64 extends transversely from the first linear portion 62 and upward (e.g., when assembled). A tapered cap or top portion 66 extends inwardly from the second linear portion 64. The top portion 66 may be triangular in shape. A gap 67 exists between the top portion 66 and the first linear portion 62 that is sized to receive a portion of the flange 34 of the housing bracket 30. The top portion 66 has an underside 68 that engages with the upper surface of the flange 34 of the housing bracket 30.

To assemble the gasket 42 within the external side mirror, the gasket 42 is placed against the underside of the housing bracket 30 oriented such that the first curved region 52 faces the curved surface 38 and the second curved region 54 faces the curved surface 40 of the skull cap 24. The hooks 60 extend upwardly into the mirror assembly and hook onto a notch or cut-out 61 of the flange 34 of the housing bracket 30. The hooks 60 are of sufficient rigidity to hold their shape, yet flexible enough relative to the main body of the gasket 42 so that they can bend around and latch onto the upper surface of the flange 34.

Once the gasket 42 is assembled to the housing bracket, the skull cap 24 and bottom cover 22 can be assembled to the housing bracket 30. As seen in FIG. 3, the skull cap 24 has an inwardly-extending flange 70 that fits under a protrusion 72 of the housing bracket 30 to interlock the skull cap 24 to the housing bracket 30. Other attachments or fasteners may be used. The lower cover 22 includes a plurality of upwardly-extending projections or guide fingers 74 that extend through corresponding apertures 76 in the housing bracket 30. This guides the skull cap 24 onto the lower cover 22 for assembly. Also, the lower cover 22 includes a plurality of attachment clips 78 that extend upwardly to flex and latch onto the housing bracket 30. In one embodiment, the attachment clips 78 of the lower cover extend higher and beyond the height of the guide fingers 74. The lower cover 22 may also include support ribs 80 that contact the outside of the hooks 60 to inhibit the hooks 60 from bending outward and out of engagement with the housing bracket 30. The skull cap 24 may also include similar support ribs 82 that hold other hooks 60 of the gasket 42. The ribs 80 of the lower cover 22 as well as the ribs 82 of the skull cap 24 trap the hooks to ensure they maintain an engagement with the housing bracket. This allows the gasket 42 to turn with the external side mirror 20 as the external side mirror folds or pivots. Thus, the gasket does not become visible upon turning of the mirror, such as if the gasket were molded or otherwise attached to the base assembly 44. Also, the attachment of the gasket 42 via the hooks 60 being trapped by the ribs 80, 82 is less expensive than overmolding a gasket directly onto the housing bracket 30.

As shown in FIG. 4, the lower cover 22 and the skull cap 24 may not directly contact or engage one another. Instead, the gasket 42 may directly contact both the lower cover 22 and the skull cap 24 while covering the cutline gap between the base assembly 44 and the external side mirror 20. In particular, the gasket 42 may cover and seal a gap between the lower edge 49 of the skull cap 24 and the base assembly 44 in an area where the lower cover 22 is not directly beneath the skull cap 24, such as where the curved surface 40 of the skull cap 24 extends beyond the curved surface 38 of the lower cover 22. When the mirror 20 pivots or rotates, the gasket 42 can slide along the surface of the base assembly 44 while still being removably mounted to the housing bracket 30 from beneath. This provides certain benefits over other potential designs, such as where a seal is overmolded over the base assembly, because such an overmold would become visible when the mirror is rotated due to the shape of the mirror.

Figure 7:
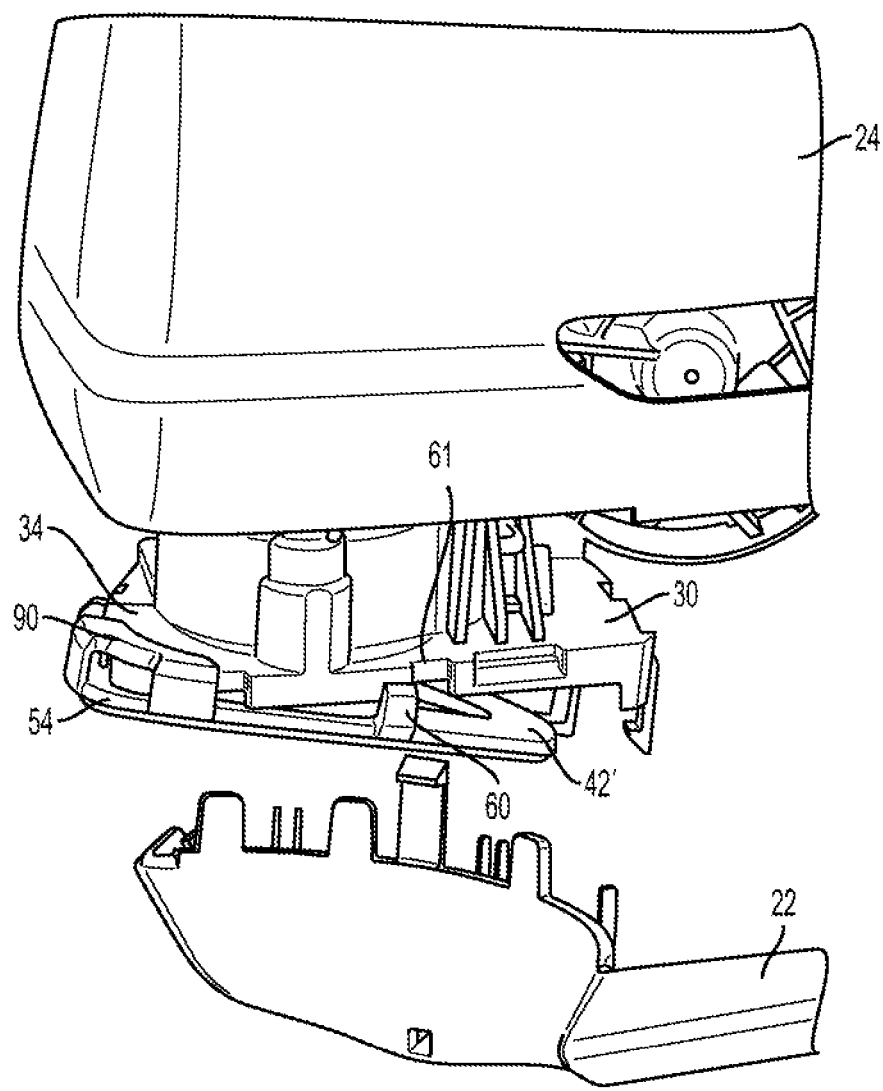
FIG. 7 is an exploded perspective view of a pivotable external side mirror, according to another embodiment.

FIG. 7 shows an alternative embodiment of a gasket 42'. The gasket 42' includes the same or similar features of the gasket 42 described with reference to FIGS. 2-6, except that the gasket 42' of FIG. 7 includes an optional strap or hook feature 90. In particular, the strap 90 extends upward from two different locations at the second curved region 54. The strap 90 loops over a corner of the flange 34 of the housing bracket 30 to which the gasket 42' attaches to. This feature aids in assembly. For example, an assembly operator can first wrap the hook 90 around the flange 34 to give a first attachment between the gasket 42' and the housing bracket 30, providing leverage and allowing the operator to then more easily press the hooks 60 into engagement with the housing bracket 30 to further secure the gasket 42' to the housing bracket 30 without having to hold the gasket in place from beneath while doing so.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An external side mirror configured to rotate relative to a connected vehicle, the external side mirror comprising:
   an outer cover;

a housing bracket within the outer cover, the housing bracket having a lower flange defining an upper surface and a lower surface; and a gasket having a base mounted to the lower surface of the lower flange, the gasket including a plurality of projections extending upward therefrom and attached to the upper surface of the lower flange;

wherein the lower flange defines an opening sized to receive power electronic wiring, and the gasket defines an opening aligned with the opening in the lower flange.

2. The external side mirror of claim 1, wherein the lower flange has a perimeter, and the projections are spaced about the perimeter.

3. The external side mirror of claim 1, wherein the gasket is made of rubber and the projections are integrally-formed with the gasket.

4. The external side mirror of claim 1, wherein the gasket includes an upper surface, a lower surface, and a perimeter edge, wherein the projections are hooks that extend from the perimeter edge.

5. The external side mirror of claim 4, wherein the gasket defines a flange extending along a periphery of the lower surface of the gasket.

6. The external side mirror of claim 4, wherein the outer cover includes a lower cover and a skull cap with a cutline gap between the skull cap and a base assembly of the vehicle, wherein the gasket seals the cutline gap.

7. The external side mirror of claim 6, wherein the lower flange of the housing bracket includes a plurality of openings and the lower cover includes a plurality of projections extending through the openings to connect the lower cover to the housing bracket.

8. The external side mirror of claim 6, wherein the lower cover includes at least one support rib that extends along an outside of one of the hooks to inhibit the hook from deflecting outwardly and trap the hook into engagement with the lower flange.

9. The external side mirror of claim 4, wherein no portion of the hooks are coplanar with the lower surface of the gasket.

10. A gasket for an external side mirror, comprising:

a base having a top surface, a bottom surface, and an edge surface about a perimeter of the gasket, wherein the perimeter of the gasket defines a first curved region and a second curved region, the first curved region having a larger radius of curvature than the second curved region;

a lip integral with the base and extending downward from the bottom surface about the perimeter, at least a portion of the lip located such that it is configured to seal against a base assembly of a vehicle;

a plurality of hooks integral with the base about the perimeter and configured to engage a flange of a housing bracket of the external side mirror, the hooks having a first portion extending transverse from the edge surface, a second portion extending upward and transverse from the first portion, and a top portion extending inward from the second portion, the top portion having a lower surface configured to contact the flange of the housing bracket of the external side mirror; and a strap extending from the top surface at two locations, the strap continuous between the two locations and configured to engage a curved corner of the housing bracket.

11. The gasket of claim 10, wherein the first portion and the second portion extend linearly.

12. The gasket of claim 10, wherein the hooks each have a bottom surface that is offset from and higher than the bottom surface of the base of the gasket.

13. An external side mirror assembly for a vehicle, comprising a lower cover;

a skull cap connected to the lower cover and having a lower edge configured to at least partially define a cutline gap between the skull cap and a base assembly of the vehicle;

a housing bracket within an interior of the connected lower cover and skull cap, the housing bracket having a lower surface and an upper surface; and a gasket removably mounted to the housing bracket, wherein the gasket includes an upper surface contacting the lower surface of the housing bracket, wherein the gasket is aligned with the cutline gap to seal the cutline gap with respect to the interior of the connected lower cover and skull cap;

wherein the lower cover has a curved surface that curves inwardly toward the interior, and the skull cap has a curved surface that curves outwardly away from the interior, and the gasket includes a first curved region aligned with the curved surface of the lower cover, a second curved region aligned with the curved surface of the skull cap, and a central void between the first and second curved regions, and wherein the gasket includes a strap extending from the upper surface at two locations of the first curved region and continuous between the two locations, wherein the strap wraps around a portion of the upper surface of the housing bracket.

14. The external side mirror assembly of claim 13, wherein the gasket includes a plurality of hooks engaging the upper surface of the housing bracket.

15. The external side mirror assembly of claim 13, further comprising a plurality of fasteners coupling the gasket to the housing bracket.

* * * * *